United States Patent
Toyoshima et al.

(10) Patent No.: US 8,671,246 B2
(45) Date of Patent: Mar. 11, 2014

(54) INFORMATION PROCESSING SYSTEM AND INFORMATION PROCESSING METHOD

(75) Inventors: Takashi Toyoshima, Kawasaki (JP); Shuji Yamamura, Kawasaki (JP); Atsushi Mori, Kanagawa (JP); Takashi Aoki, Kanagawa (JP)

(73) Assignee: Fujitsu Limited, Kawasaki (JP)

( * ) Notice: Subject to any disclaimer, the term of this patent is extended or adjusted under 35 U.S.C. 154(b) by 503 days.

(21) Appl. No.: 12/510,510

(22) Filed: Jul. 28, 2009

(65) Prior Publication Data

US 2009/0287884 A1 Nov. 19, 2009

Related U.S. Application Data

(63) Continuation of application No. PCT/JP2007/051457, filed on Jan. 30, 2007.

(51) Int. Cl.
*G06F 12/00* (2006.01)
*G06F 13/00* (2006.01)
*G06F 13/28* (2006.01)

(52) U.S. Cl.
USPC ............ 711/137; 711/213; 711/118; 711/159

(58) Field of Classification Search
None
See application file for complete search history.

(56) References Cited

U.S. PATENT DOCUMENTS

| | | | |
|---|---|---|---|
| 5,983,324 A | 11/1999 | Ukai et al. | |
| 6,438,673 B1 * | 8/2002 | Jourdan et al. | 711/213 |
| 7,181,723 B2 | 2/2007 | Luk et al. | |
| 2007/0067577 A1 * | 3/2007 | Henry et al. | 711/137 |

FOREIGN PATENT DOCUMENTS

| | | |
|---|---|---|
| JP | 52-63038 | 5/1977 |
| JP | A 63-318654 | 12/1988 |
| JP | A 4-340637 | 11/1992 |
| JP | A 5-73421 | 3/1993 |
| JP | A 7-253926 | 10/1995 |
| JP | A 8-292913 | 11/1996 |
| JP | A 9-319652 | 12/1997 |
| JP | A 10-207772 | 8/1998 |
| JP | A 10-320212 | 12/1998 |
| JP | A 10-320285 | 12/1998 |
| JP | A 10-333916 | 12/1998 |
| JP | A 2000-35894 | 2/2000 |
| JP | A 2001-195263 | 7/2001 |
| JP | A 2001-331793 | 11/2001 |
| JP | A 2001-344152 | 12/2001 |
| JP | A 2002-215456 | 8/2002 |
| JP | A 2003-44357 | 2/2003 |
| JP | A 2003-223359 | 8/2003 |
| JP | A 2006-524375 | 10/2006 |
| WO | WO 2004/107177 A2 | 12/2004 |

OTHER PUBLICATIONS

English Translation of Written Opinion corresponding to PCT/JP2007/051457.

* cited by examiner

*Primary Examiner* — Reginald Bragdon
*Assistant Examiner* — Stella Eun
(74) *Attorney, Agent, or Firm* — Fujitsu Patent Center

(57) ABSTRACT

An information processing system performs a prefetch for predicting data that is likely to be accessed by a central processing unit, reading the predicted data from a main memory, and storing the data in a cache area in advance. The information processing system includes a usage information storage unit that stores therein usage information indicating whether prefetched data has been accessed; and a usage information writing unit that writes the usage information of the prefetched data in the usage information storage unit.

6 Claims, 10 Drawing Sheets

FIG.3
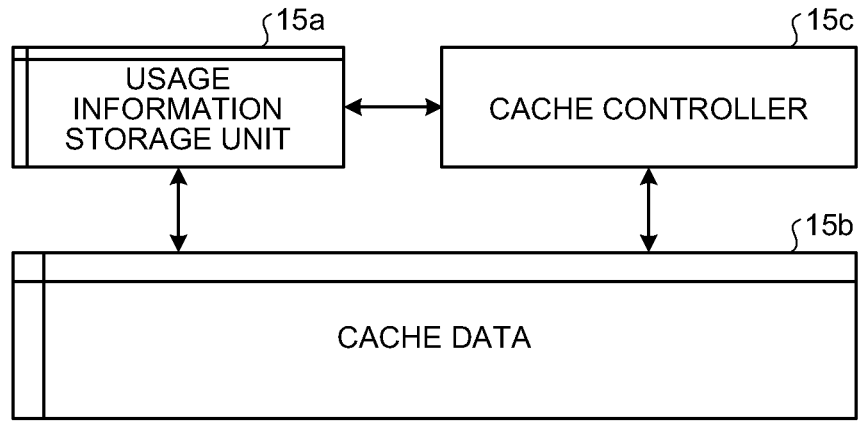
FIG.4
| TAG | INDEX | USAGE INFORMATION | COMMAND IDENTIFIER |
|---|---|---|---|
| tag.a | idx.1 | ○ | 111.111 |
| tag.b | idx.2 | × | 111.112 |
| tag.c | idx.3 | ○ | 111.113 |
| ⋮ | ⋮ | ⋮ | ⋮ |
FIG.5
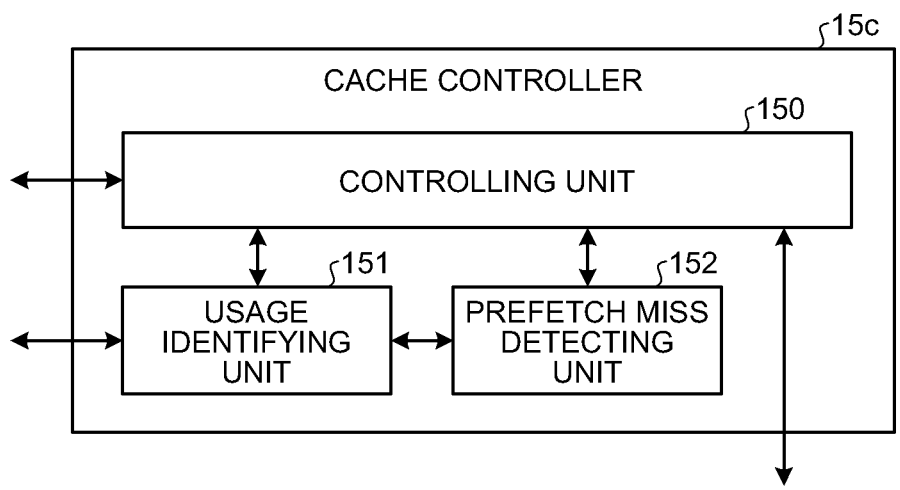

INFORMATION PROCESSING SYSTEM AND INFORMATION PROCESSING METHOD

This application is a continuation of PCT international application Ser. No. PCT/JP2007/051457 filed on Jan. 30, 2007 which designates the United States, incorporated herein by reference, the entire contents of which are incorporated herein by reference.

FIELD

The embodiments discussed herein are directed to an information processing system and an information processing method for performing prefetch for predicting data that is likely to be accessed by a central processing unit (CPU), reading the predicted data from a main memory, and storing the data in a cache area in advance.

BACKGROUND

A method has been developed for improving processing speed by storing data in a cache area in a CPU having a faster access speed, instead of in a main memory. As a method for determining which data is to be placed in the cache area, Japanese Laid-open Patent Publication No. 10-320285, for example, discloses a technology called prefetching. In the Prefetching, data that is likely to be accessed by a CPU is predicted, the predicted data is read from a main memory, and the data is stored in the cache area in advance.

However, in the prefetching, because data that is likely to be accessed is predicted and such data is read from the main memory, a miss in prediction can cause useless data to occupy the cache area, expelling data that should be maintained therein. Therefore, if the prediction in the prefetching is not accurate, an average memory access speed can be decreased.

To address this problem, Japanese Laid-open Patent Publication No. 04-340637, for example, discloses a technology for improving the prediction accuracy of prefetching. In this technology, it is determined whether an access is sequential, and if so, a predetermined amount of data is prefetched into the cache area.

However, the conventional technologies mentioned above cannot detect whether the data read from the main memory and placed in the cache area is actually used. Therefore, it is impossible to determine whether the prefetching is working effectively.

SUMMARY

According to an aspect of the invention, an information processing system performs a prefetch for predicting data that is likely to be accessed by a central processing unit, reading the predicted data from a main memory, and storing the data in a cache area in advance. The information processing system includes a usage information storage unit that stores therein usage information indicating whether prefetched data has been accessed; and a usage information writing unit that writes the usage information of the prefetched data in the usage information storage unit.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a block diagram of a structure of a cache depicted in FIG. 2;

FIG. 4 is a schematic for explaining a usage information storage unit depicted in FIG. 3;

FIG. 5 is a diagram of a structure of a cache controller depicted in FIG. 3;

DESCRIPTION OF EMBODIMENTS

Preferred embodiments of an information processing system according to the present invention will now be explained in detail with reference to the attached drawings.

[a] First Embodiment

In an embodiment described below, an information processing system according to a first embodiment of the present invention, and a process performed thereby will be explained.

<Information Processing System According to First Embodiment>

Figure 1:
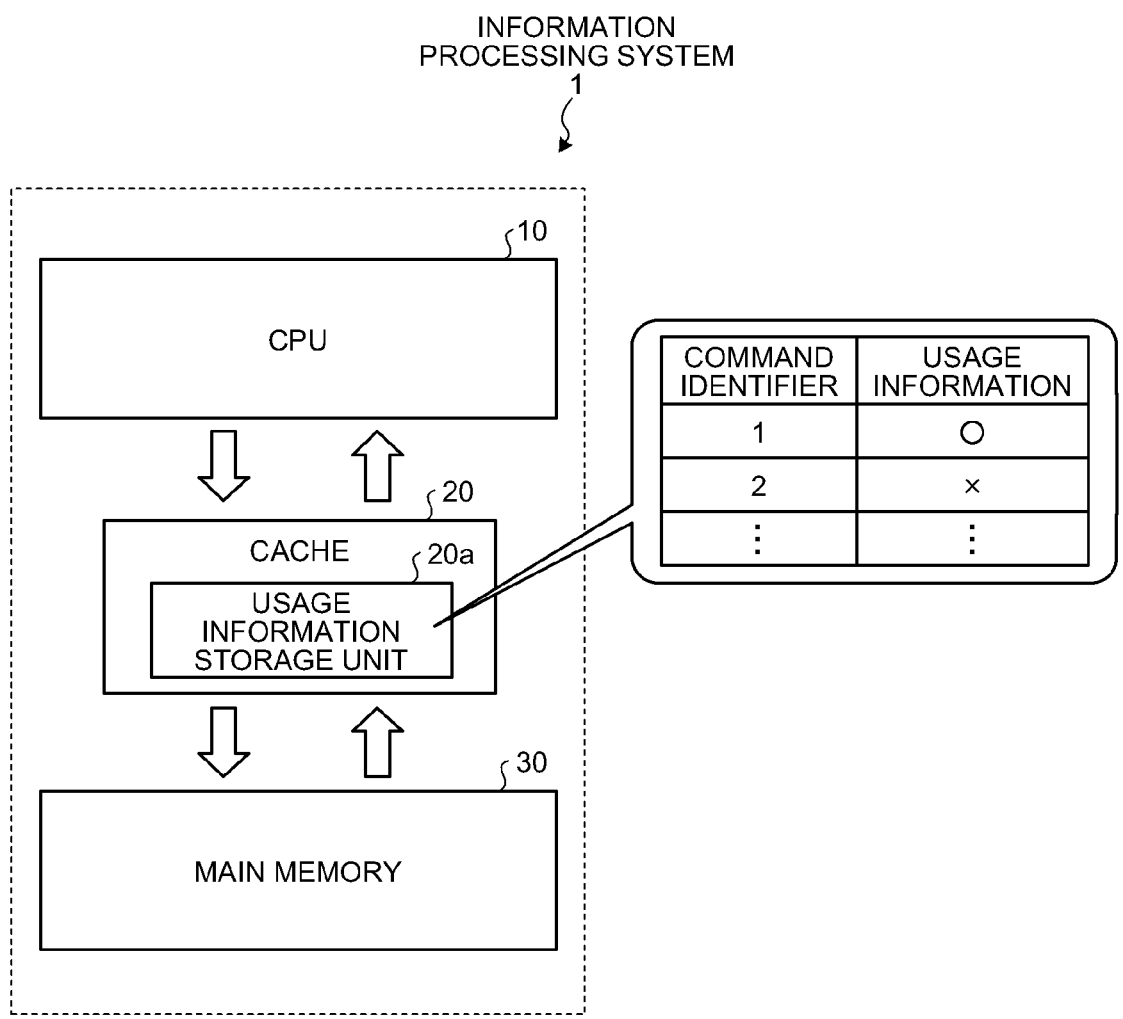
FIG. 1 is a schematic for explaining an information processing system according to a first embodiment of the present invention.

First, the information processing system according to a first embodiment of the present invention will be explained with reference to FIG. 1. FIG. 1 is a schematic for explaining the information processing system according to the first embodiment.

An information processing system 1 according to the first embodiment performs prefetching, that is, predicts data that is likely to be accessed by a CPU, reads the predicted data from a main memory, and stores the data in a cache area in advance. The information processing system 1 determines whether the prefetching is working effectively.

The information processing system 1 according to the first embodiment has a hierarchical memory structure, and includes a CPU 10, a cache 20, and a main memory 30, as depicted in FIG. 1. The cache 20 includes a usage information storage unit 20a that stores therein command identifiers each uniquely identifying a command causing prefetch, and pieces of usage information each indicating whether prefetched data has been accessed, while being associated with one another. The cache 20 may be provided in the CPU 10, or may be provided in plurality, both inside and outside the CPU 10, as will be explained later with reference to FIG. 2.

The information processing system 1 having the structure described above writes usage information corresponding to prefetched data to the usage information storage unit 20a. More specifically, when new cache data is placed in the cache 20 via a normal memory access, the information processing system 1 sets the usage information in the cache 20 (this is represented by a circle in the usage information in the example depicted FIG. 1). When new cache data is placed in the cache 20 via a prefetch access, the information processing system 1 resets the usage information in the cache 20 (this is represented by a cross in the usage information in the example depicted FIG. 1). Then, when the CPU 10 accesses the prefetched data (that is, the data with its usage information reset), the information processing system 1 sets the usage information.

Thereafter, upon discarding a piece of the data in the cache 20, the information processing system 1 reads the usage information of the data to be discarded from the usage information storage unit 20a. More specifically, the information processing system 1 reads the usage information from the usage information storage unit 20a, and determines whether the data has been used, so as to detect a prefetch miss.

In this manner, the information processing system 1 can determine whether the data read from the main memory 30 and placed in the cache 20 is actually used, and further determine whether the prefetching is working effectively, as mentioned above as the main feature.

<Information Processing System>

Figure 2:
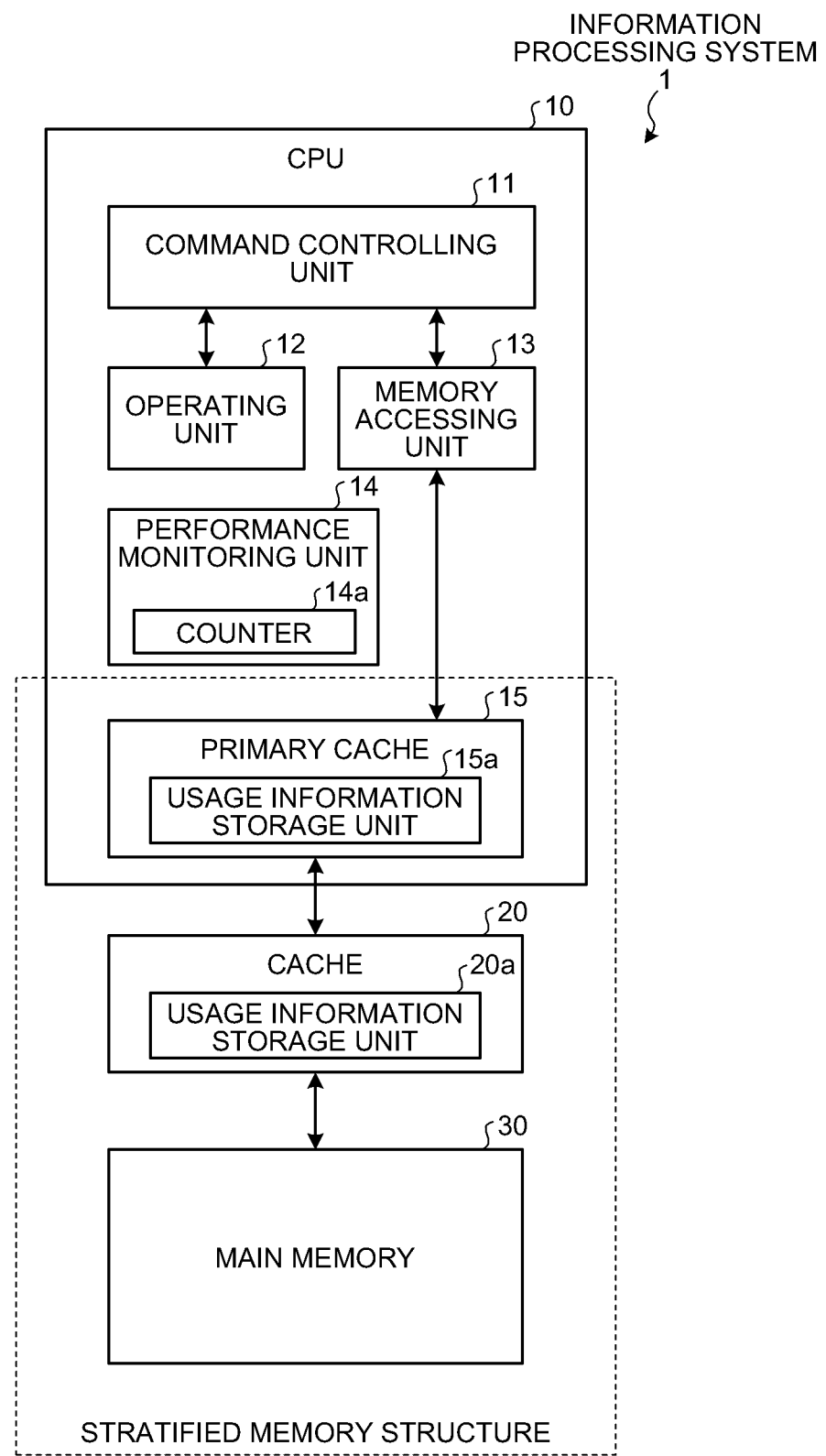
FIG. 2 is a block diagram of a structure of the information processing system depicted in FIG. 1.

The structure of the information processing system 1 depicted in FIG. 1 will now be explained with reference to FIG. 2. FIG. 2 is a block diagram of the structure of the information processing system 1 according to the first embodiment. As depicted in FIG. 2, the information processing system 1 includes the CPU 10, a secondary cache 20, and the main memory 30.

The information processing system 1 has a hierarchical memory structure, and includes a primary cache 15 inside the CPU 10, the cache 20 as a secondary cache, and the main memory 30. In other words, faster access speed is achieved in the order of the primary cache 15, the cache 20, and the main memory 30. Reversely, more information is stored in the order of the main memory 30, the cache 20, and the primary cache 15.

The CPU 10 includes a command controlling unit 11, an operating unit 12, a memory accessing unit 13, a performance monitoring unit 14, and the primary cache 15. The command controlling unit 11 controls various commands. The operating unit 12 performs various operations according to commands issued by the command controlling unit 11. The memory accessing unit 13 accesses the memory according to commands issued by the command controlling unit 11. The performance monitoring unit 14 is a function used by a computer program to obtain dynamic information about the CPU 10 during operations thereof following predetermined procedures. The primary cache 15 stores therein part of the data stored in the main memory 30.

The performance monitoring unit 14 includes a counter 14a that performs a prefetch miss count indicating that prefetched data has not been accessed. The performance monitoring unit 14 having such a structure converts the prefetch miss count performed by the counter 14a to prefetch miss information in a format usable by the computer program. The prefetch miss information is read by a profiler.

More specifically, the performance monitoring unit 14 provides the prefetch miss information in a format that can be read by a computer program according to an interface. In other words, a program developer can check how effectively prefetching performed by a computer program he/she developed, is working during execution thereof.

The performance monitoring unit 14 also notifies the computer program that the prefetch miss count exceeds a predetermined threshold. In other words, the performance monitoring unit 14 notifies the CPU 10 that, through an interrupt, a counter overflow occurs.

<Cache>

The structure of the information processing system 1 depicted in FIG. 1 will now be explained with reference to FIGS. 3 to 5. FIG. 3 is a block diagram of a structure of the cache according to the first embodiment. FIG. 4 is a schematic explaining the usage information storage unit. FIG. 5 is a diagram of a structure of a cache controller. The primary cache 15 depicted in FIGS. 3 to 5 has the same structure as that of the cache 20 as the secondary cache depicted in FIG. 1.

As depicted in FIG. 3, the primary cache 15 includes a usage information storage unit 15a, cache data 15b, and a cache controller 15c. The cache controller 15c reads and writes data stored in the usage information storage unit 15a and the cache data 15b. Processes performed by each of these elements will now be explained.

The usage information storage unit 15a stores therein pieces of usage information each indicating whether there has been an access to prefetched data. More specifically, as depicted in FIG. 4, the usage information storage unit 15a stores therein: tags of command data; indexes of the command data; pieces of usage information each indicating whether the prefetched data has been accessed; and command identifiers each uniquely identifying the command that causes prefetch, while being associated with one another. The command identifier may be an address of the memory where the command is stored.

The cache data 15b, having a higher access speed than the main memory 30, stores therein part of the data stored in the main memory 30, and the data stored therein is read and written by the cache controller 15c that is to be described below.

The cache controller 15c writes usage information of prefetched data to the usage information storage unit 15a, and reads out usage information of data to be discarded when the data is discarded from the cache data 15b.

A specific structure of the cache controller 15c will now be explained with reference to FIG. 5. The cache controller 15c includes a controlling unit 150, a usage identifying unit 151, and a prefetch miss detecting unit 152. Processes performed by each of these elements will now be explained.

The controlling unit 150 controls various processes performed by the cache controller 15c. More specifically, when a memory access is accepted from the CPU 10, the controlling unit 150 determines whether there is a cache hit. If the controlling unit 150 determines that there is a cache hit, the controlling unit 150 sets the usage information.

If the controlling unit 150 determines that there is a cache miss, the controlling unit 150 selects cache data to be replaced (that is, data to be discarded). The controlling unit 150 then instructs the usage identifying unit 151, to be described later, to determine whether the usage information of the cache data to be replaced is set. Then, after the usage identifying unit 151 determines that the usage information of the cache data to be replaced is set, or after the prefetch miss detecting unit 152, which will be described later, performs a prefetch miss detecting process, when applicable, the controlling unit 150 determines whether the cache data to be replaced is prefetched data.

If it is determined that the cache data to be replaced is prefetched data, the controlling unit 150 resets the usage information. If it is determined that the cache data to be replaced is not prefetched data, the controlling unit 150 sets the usage information.

The usage identifying unit 151 reads the usage information of the data to be discarded from the usage information storage unit 15a. More specifically, upon receiving the instruction to determine whether the usage information of the data to be replaced is set, the usage identifying unit 151 determines whether the usage information of the data to be replaced is set.

If the usage information of the data to be replaced is set, the usage identifying unit 151 notifies the controlling unit 150 of the result. If the usage information of the data to be replaced is not set, the usage identifying unit 151 sends an instruction to the prefetch miss detecting unit 152 to perform the prefetch miss detecting process.

The prefetch miss detecting unit 152 then detects a prefetch miss. More specifically, upon receiving the instruction to perform the prefetch miss detecting process from the usage identifying unit 151, the prefetch miss detecting unit 152 performs the prefetch miss detecting process. In other words, the prefetch miss detecting unit 152 sends an instruction to the CPU 10 to increment the counter 14a to count the prefetch miss.

<Process Performed by Information Processing System>

Figure 6:
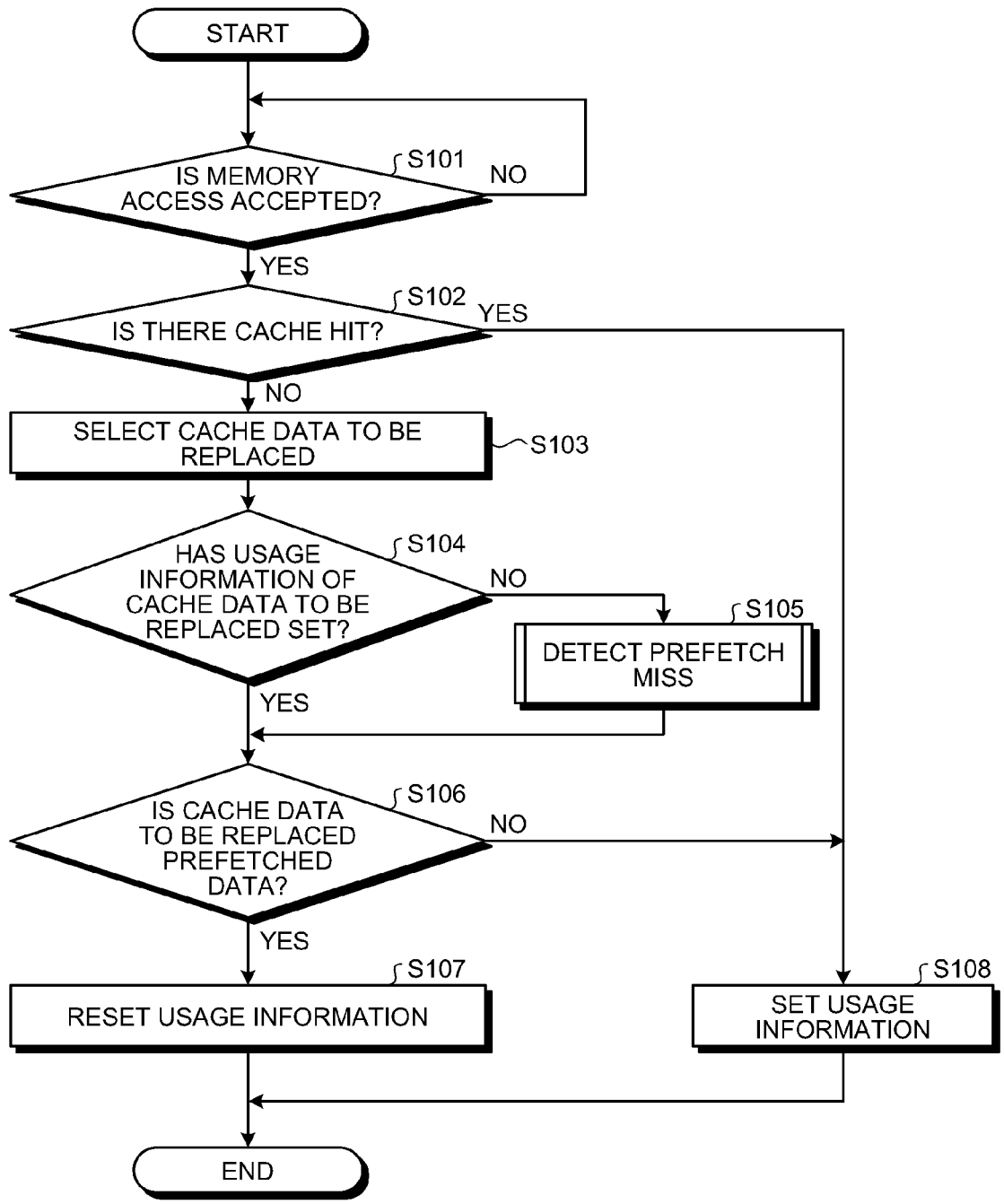
FIG. 6 is a flowchart of a usage information writing operation performed by the information processing system depicted in FIG. 2.
Figure 7:
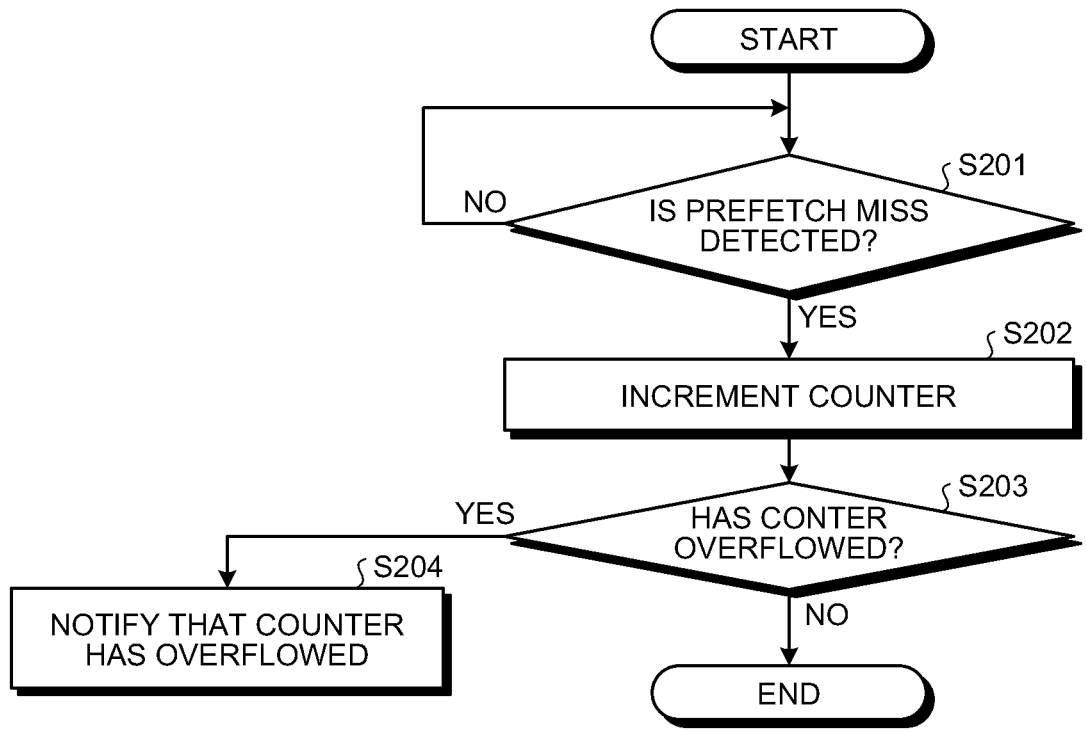
FIG. 7 is a detailed flowchart of a prefetch miss detection operation performed by the information processing system depicted in FIG. 2.

Processes performed by the information processing system 1 according to the first embodiment will now be explained with reference to FIGS. 6 and 7. FIG. 6 is a flowchart of the usage information writing process performed by the information processing system 1 according to the first embodiment. FIG. 7 is a detailed flowchart of the prefetch miss detection process performed by the information processing system 1 according to the first embodiment.

As depicted in FIG. 6, if a memory access from the CPU 10 is accepted (YES at Step S101), the cache 20 in the information processing system 1 determines whether there is a hit to the cache data 15b (Step S102). If it is determined that there is a hit to the cache data 15b (YES at Step S102), the usage information is set (Step S108).

If there is no cache hit to the cache data 15b (NO at Step S102), the cache 20 selects cache data to be replaced (Step S103), and determines whether the usage information of the cache data to be replaced is set (Step S104).

If the usage information of the cache data to be replaced is set (YES at Step S104), then the cache 20 further determines whether the cache data to be replaced is prefetched data (Step S106). If the usage information of the cache data to be replaced is not set (NO at Step S104), the prefetch miss detecting process is performed in a manner that will be described later (Step S105), and then, it is determined whether the cache data to be replaced is prefetched data (Step S106).

If it is determined that the cache data to be replaced is prefetched data (YES at Step S106), then the cache 20 resets the usage information thereof (Step S107). If the cache data to be replaced is determined not to be prefetched data (NO at Step S106), the cache 20 sets the usage information thereof (Step S108).

Prefetch miss detecting process (Step S105) performed by the information processing system 1 according to the first embodiment will now be explained with reference to FIG. 7. If a prefetch miss is detected (YES at Step S201), the cache 20 in the information processing system 1 notifies the CPU 10 of the detection result. In response, the CPU 10 increments the counter 14a (Step S202), and determines whether the counter 14a has overflowed (Step S203).

If the CPU 10 determines that the counter 14a has overflowed (YES at Step S203), the CPU 10 notifies to the computer program that the counter 14a has overflowed (Step S204). If the CPU 10 determines that the counter 14a has not overflowed (NO at Step S203), the prefetch miss detecting process is ended.

As described above, according to the first embodiment, the information processing system 1 maintains the usage information, indicating whether prefetched data has been accessed, and writes the usage information of the prefetched data. Therefore, it is possible to determine whether the data read from the main memory 30 and placed in the cache area is actually used, making possible to determine whether the prefetching is working effectively.

Furthermore, according to the first embodiment, the information processing system 1 reads usage information of data to be discarded when the data is discarded from the cache area. Therefore, it is possible to determine whether the data has been accessed based on the usage information when the data is discarded from the cache area, making it possible to determine whether the prefetch is useless.

Furthermore, according to the first embodiment, the counter 14a performs a prefetch miss count indicating that prefetched data has not been accessed. Therefore, the prefetch miss count can be checked.

Furthermore, according to the first embodiment, the prefetch miss count is converted to have a format usable by a computer program. Therefore, a developer can check how effectively its prefetch function is working while executing the computer program.

Furthermore, according to the first embodiment, the computer program is notified when the prefetch miss count exceeds a predetermined threshold. Therefore, the prefetch miss can be counted accurately even in an environment where the counter is often incremented so often that the counter overflows.

Furthermore, according to the first embodiment, the information processing system 1 maps and stores therein a command identifier uniquely identifying a command causing prefetch, and the usage information of the data prefetched by the command. The information processing system 1 also writes usage information corresponding to a command identifier of a command causing the data to be stored in the cache area. Therefore, when a prefetch miss occurs, it is possible to uniquely identify which command has resulted in the prefetch miss.

Furthermore, according to the first embodiment, a profiler regularly reads the prefetch miss count converted to have a format usable by the computer program. Therefore, it is possible to check where a prefetch miss occurs in the computer program.

Furthermore, according to the first embodiment, when the computer program is notified that the prefetch miss count exceeds a predetermined threshold, a profiler reads the prefetch miss count converted to have a format usable by the computer program. Therefore, it is possible to count the prefetch miss correctly, as well as to examine where prefetch fails in the computer program.

[b] Second Embodiment

In the above first embodiment, a prefetch miss is simply detected; however, the present invention is not limited to this, and a prefetch command that is less likely to be effective may be disabled based on the detected prefetch miss.

Figure 8:
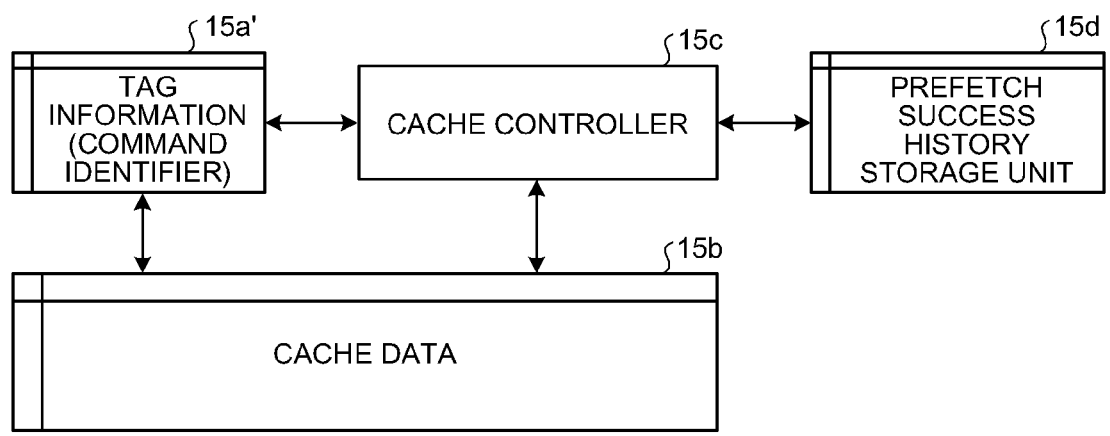
FIG. 8 is a diagram of a structure of a cache included in an information processing system according to a second embodiment of the present invention.
Figure 9:
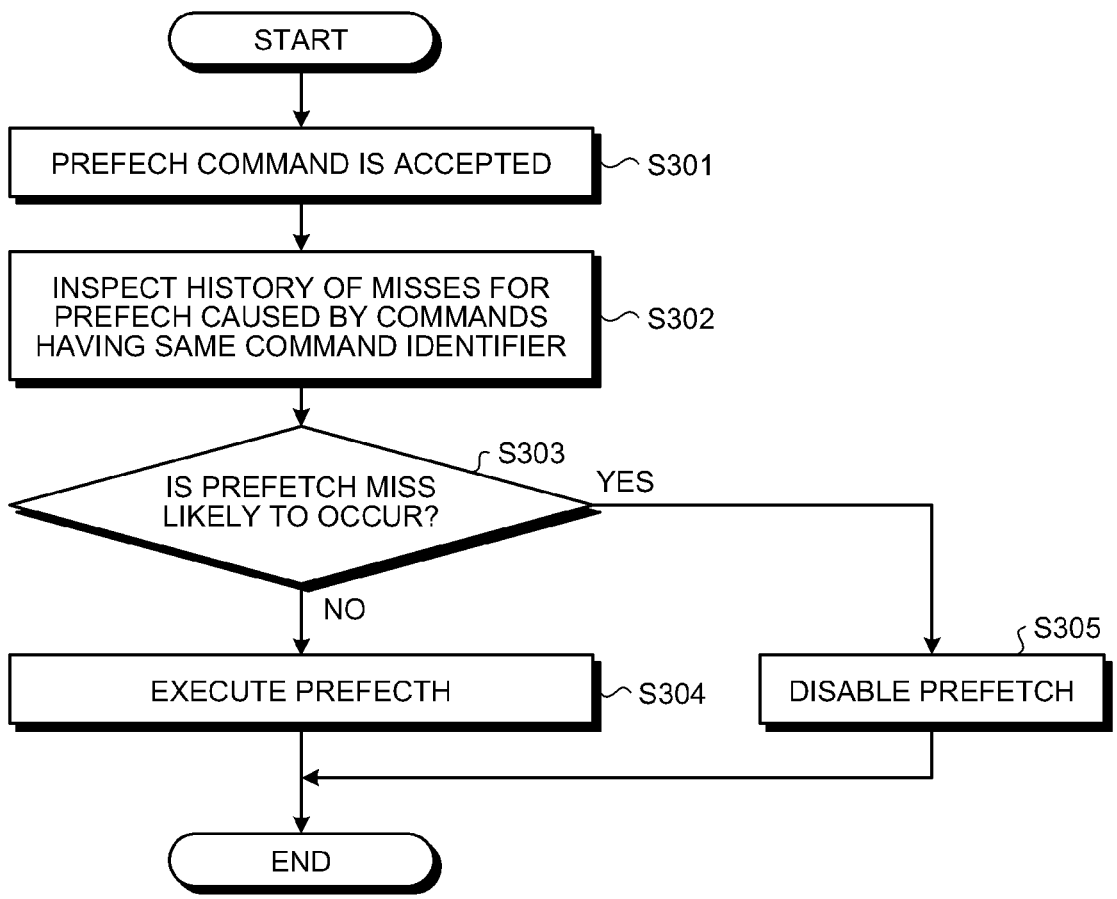
FIG. 9 is a flowchart of a prefetch disabling process performed by the cache in the information processing system depicted in FIG. 8.

In a second embodiment of the present invention described below, a prefetch command that is less likely to be effective is disabled using prefetch success history information indicating whether prefetched data has been accessed for each of the command identifiers. A structure of a cache in an information processing system according to the second embodiment and a prefetch disabling process performed thereby will now be explained with reference to FIGS. 8 and 9. FIG. 8 is a diagram of the structure of the cache included in the information processing system according to the second embodiment. FIG. 9 is a flowchart of the prefetch disabling process performed by the cache in the information processing system depicted in FIG. 8.

First, the structure of the cache included in the information processing system according to the second embodiment will be explained with reference to FIG. 8. The cache included in the information processing system according to the second embodiment is different from the cache 15 according to the first embodiment in that the former is provided with a prefetch success history.

A prefetch success history storage unit 15*d* stores therein, for each command identifier, prefetch success history information indicating whether data prefetched by a command has been accessed. More specifically, the prefetch success history information is read and written by the cache controller 15*c*, and referred to so as to determine whether prefetch should be executed before executing the prefetch. To explain with reference to a specific example, the prefetch success history storage unit 15*d* stores therein command identifiers, prefetch success counts, and prefetch miss counts, while being associated with one another.

The prefetch process performed by the cache 15 according to the second embodiment will now be explained with reference to FIG. 9. This is an access control process that disables prefetch caused by a command having a specific command identifier.

Upon accepting a prefetch command (Step S301), the cache included in the information processing system according to the second embodiment reads and inspects prefetch success history information, stored in the prefetch success history storage unit 15*d*, on a history of misses for prefetch caused by a command having the same command identifier (Step S302).

Using the prefetch success history information read from the prefetch success history storage unit 15*d*, the cache determines whether a possibility that the prefetched data is accessed is higher or lower than a given threshold. More specifically, the cache determines whether the possibility of a prefetch miss occurring is high (Step S303).

If it is determined that a prefetch miss is less likely to occur (NO at Step S303), the cache executes the prefetch (Step S304). If it is determined that a prefetch miss is likely to occur (YES at Step S303), the prefetch is disabled (Step S305).

In the manner described above, according to the second embodiment, the information processing system stores therein the prefetch success history information, indicating whether data prefetched by a command has been accessed, for each of the command identifiers of the command; reads the usage information corresponding to the command identifier of the command causing the data to be discarded to be stored in the cache area, when the data is discarded from the cache area; and writes the prefetch success history information using the usage information. Therefore, it is possible to determine whether a prefetch request issued by a command having the command identifier results in an effective prefetch.

Furthermore, according to the second embodiment, the stored prefetch success history information is used to detect a command identifier of a command causing a prefetch whose resultant prefetched data has a possibility of being accessed at or lower than a predetermined threshold; and the prefetch executed by a command corresponding to the detected command identifier is disabled. Therefore, it is possible to reduce useless memory accesses, further reducing power consumption. In addition, more important memory operations with higher priority can be performed due to a reduction of bus traffic, thus increasing the system performance.

[b] Third Embodiment

The embodiments of the present invention have been explained above; however, the present invention may be implemented in various other embodiments in addition to those described above. Thus, another embodiment of the present invention will now be explained as a third embodiment of the presentation.

(1) Group ID

In the first embodiment, the usage information storage unit stores therein the usage information for each of the command identifiers uniquely identifying a command. However, the present invention is not limited to this, and a usage information storage unit may also store therein usage information for each group ID that specifies command identifiers almost uniquely.

Figure 10:
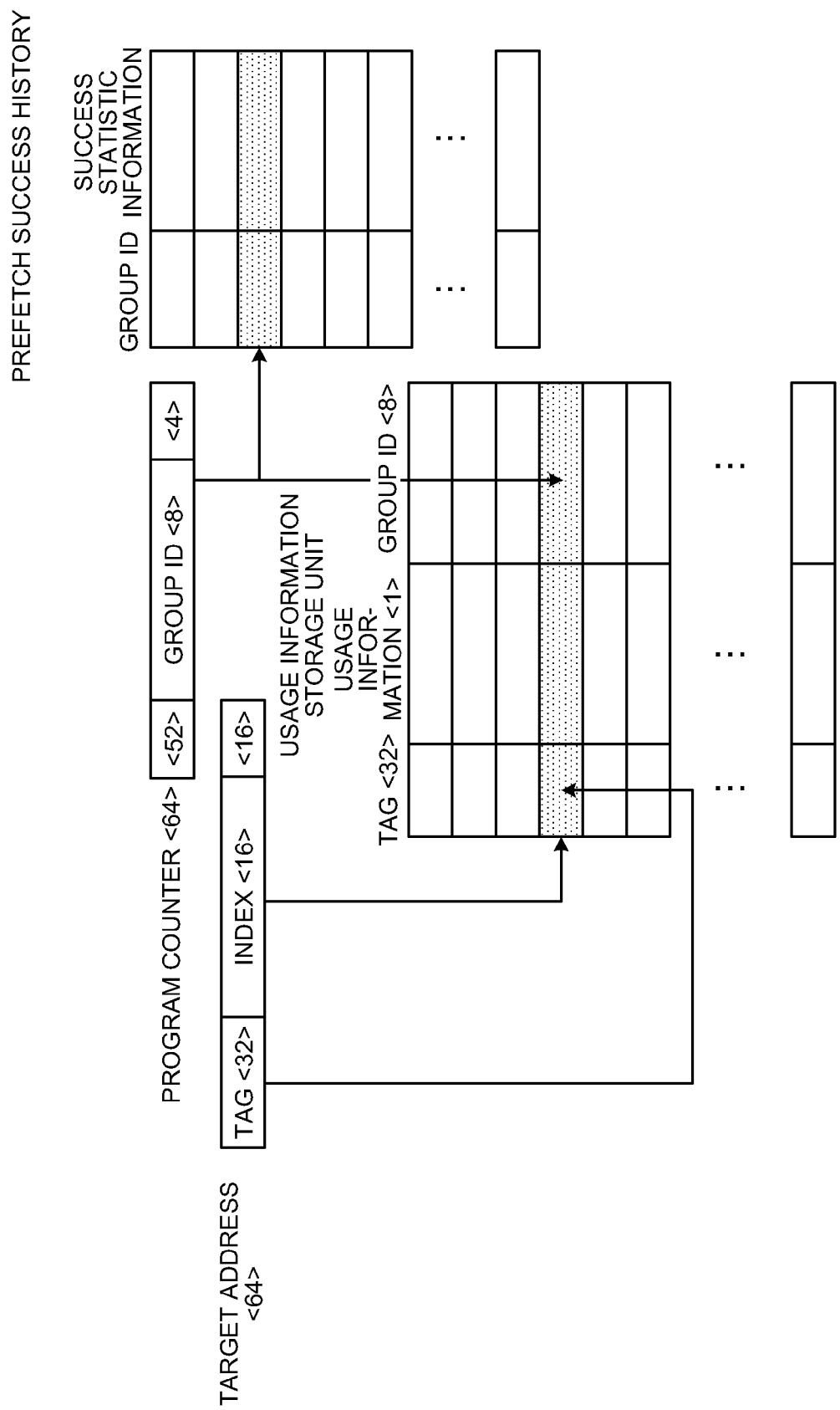
FIG. 10 is a schematic for explaining an information processing system according to a third embodiment of the present invention.

More specifically, the usage information storage unit included in an information processing system according to the third embodiment stores therein group IDs and pieces of usage information, while being associated with each other, as depicted in FIG. 10. The group ID uniquely identifies a group of commands that are grouped based on addresses of the commands, and is obtained from a hash function that is less likely to generate redundant identifiers for commands that are executed nearby.

Figure 11:
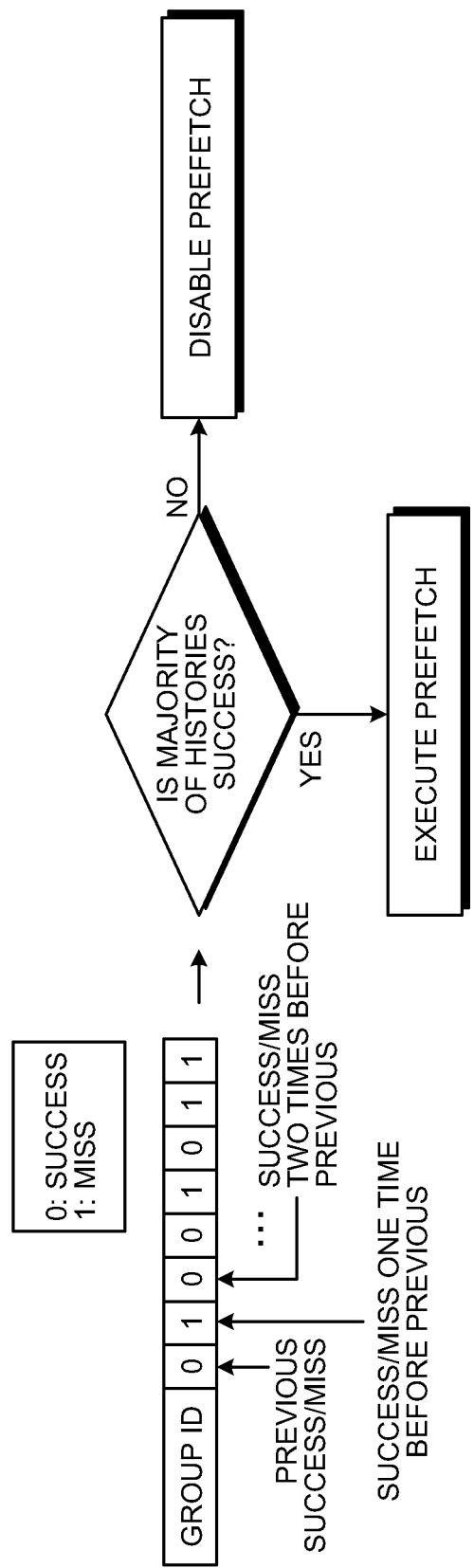
FIG. 11 is another schematic for explaining the information processing system according to the third embodiment.

A prefetch success history storage unit stores therein group IDs and pieces of success statistic information, while being associated with each other. As depicted in FIG. 11, upon executing prefetch, the success statistic information, corresponding to the group ID of the command causing the prefetch, is read from the prefetch success history storage unit to determine whether the prefetch should be executed or disabled.

In this manner, the usage information storage unit stores therein usage information, associated with a group ID uniquely identifying a group of the commands executed on the CPU, on data prefetched by a command, the commands being grouped based on the addresses thereof. Then, usage information corresponding to a group ID of a command causing the data to be stored in the cache area is written. Therefore, it is possible to almost uniquely identify the command by the group ID, thus reducing the number of entries stored in the usage information storage unit.

Furthermore, the prefetch success history storage unit stores therein, for each of the group IDs, the prefetch success history information indicating whether the data prefetched by a command has been accessed. Also, upon discarding a piece of the data from the cache area, the usage information of the group ID, assigned to the command that has caused the data to be discarded to be stored in the cache area, is read and the prefetch success history information is written based on the usage information. Therefore, it is possible to determine whether a prefetch request issued by the command having the command identifier is effective, as well as to reduce the number of entries stored in the usage information storage unit.

Furthermore, the stored prefetch success history information is used to detect a group ID assigned to a command causing a prefetch whose resultant prefetched data has a possibility of being accessed at or lower than a predetermined threshold, to disable prefetch executed by the commands belonging to the detected group ID. Therefore, it is possible to improve the performance of the system as a whole, as well as to reduce the number of the entries stored in the usage information storage unit.

(2) Transition Information

In the first embodiment, the usage information storage unit stores therein the usage information indicating whether prefetched data has been accessed. However, the present invention is not limited to this, and the usage information storage unit may store transition information that is transited to another state depending on success or failure of prefetch.

Figure 12:
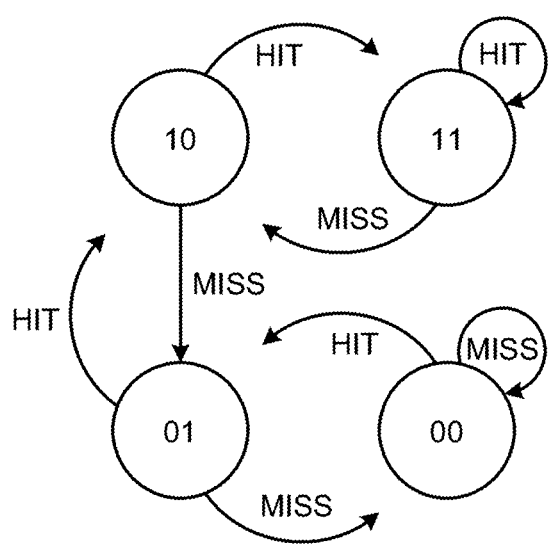
FIG. 12 is still another schematic for explaining the information processing system according to the third embodiment.

More specifically, the information processing system according to the third embodiment stores therein, for each of the command identifiers, the transition information that is transited to another state depending on success of failure of prefetch. For example, the information processing system manages the transition information, instead of a simple history, by transiting its state depending on success or failure of prefetch as depicted in FIG. 12. In the example depicted in FIG. 12, if prefetch succeeds, a 2-bit value is incremented; and if prefetch fails, the value is decremented. The transition information is stored not only for each of the command identifiers, but also for each of the group IDs.

In this manner, the information processing system stores therein, for each of the command identifiers, the transition information transiting its state depending on success or failure of prefetch; upon discarding data from the cache area, the information processing system reads the usage information corresponding to the command identifier of the command that has caused the data to be discarded to be stored in the cache area; and the stored transition information is transited to another state depending on the usage information. Therefore, it is possible to highly reliably determine whether a prefetch request issued by the command having the command identifier will result in an effective prefetch.

Furthermore, the stored transition information is used to detect a command identifier of a command resulting in the prefetched data that is less likely to be accessed; and the prefetch executed by the command corresponding to the detected command identifier is disabled, thereby reliably detecting useless prefetch to reduce useless memory accesses.

Furthermore, the transition information, transiting its state based on success of failure of prefetch, is stored for each of the group IDs. Also, upon discarding data from the cache area, its usage information of the group ID, assigned to the command that has caused the data to be discarded to be stored in the cache area, is read and the transition information is transited to another state based on the usage information. Therefore, it is possible to reduce the number of entries stored in a transition information storage unit, to reliably detect useless prefetch to reduce useless memory accesses.

Furthermore, the stored transition information is used to detect a group ID of prefetched data that is less likely to be accessed, to disable the prefetch executed by the command identified by the detected group ID. Therefore, it is possible to reliably determine whether a prefetch request issued by a command is effective, as well as to reduce the number of entries stored in the usage information storage unit.

(3) Compiler

Also, according to the present invention, a compiler may be used to optimize the prefetching. More specifically, using a prefetch miss count in a computer-program-usable format read by a profiler, a prefetch command in the computer program is optimized. For example, in this optimization, failed software prefetch is deleted, or re-inserted to another location so as to become no longer failed.

In this manner, a prefetch command in the computer program is optimized using the prefetch miss count in a computer-program-usable format read by the profiler. Thus, for example, as a result of failed software prefetch being deleted or re-inserted to another location so as to become no longer failed, it is possible to reduce useless bus traffic or to reduce cache misses, thereby improving performance of the computer program.

Furthermore, a prefetch command in the computer program is optimized using the prefetch miss count in a computer-program-usable format read by the profiler. Therefore, it is possible to count the prefetch miss correctly, as well as to reduce useless bus traffic or to reduce cache misses, thereby improving the performance of the computer program.

(4) System Structure, etc.

Each component of the units depicted in the drawings is conceptual in functional, and is not necessarily physically configured as depicted. That is, the specific patterns of distribution and unification of the components are not meant to be restricted to those depicted in the drawings. All or part of the components may be functionally or physically distributed or unified in arbitrary units according to various kinds of loads and the state of usage. For example, the usage identifying unit 151 and the prefetch miss detecting unit 152 may be unified.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An information processing system that performs a prefetch for predicting data that is likely to be accessed by a central processing unit, reading the predicted data from a main memory, and storing the predicted data in a cache area in advance, the information processing system comprising:
    a usage information storage unit that stores therein a command identifier uniquely identifying a command causing the prefetch and usage information of data prefetched by the command, the usage information being associated with the command identifier and indicating whether the prefetched data has been accessed;
    a usage information writing unit that writes the usage information of the prefetched data in the usage information storage unit;
    a usage information reading unit that, upon discarding data from the cache area, reads usage information of the data from the usage information storage unit;
    a counting unit that performs a prefetch miss count indicating the number of times when the prefetched data has not been accessed, by using the usage information read by the usage information reading unit;
    a converting unit that converts the prefetch miss count, performed by the counting unit, to have a format usable by a computer program; and
    a notifying unit that notifies that the prefetch miss count, performed by the counting unit, has exceeded a predetermined threshold to a computer program.

2. The information processing system according to claim 1, further comprising a regularly-reading unit that regularly reads the prefetch miss count, converted by the converted unit to have a format usable by the computer program, to a profiler.

3. The information processing system according to claim 2, further comprising a prefetch command changing unit that optimizes a prefetch command in the computer program using the prefetch miss count, in a format usable by the computer program, read to the profiler by the regularly-reading unit.

4. The information processing system according to claim 1, further comprising:

a notification reading unit that, upon being notified by the notifying unit that the prefetch miss count has exceeded a predetermined threshold, reads the prefetch miss count, converted by the converting unit to have a format usable by the computer program, to a profiler.

5. The information processing system according to claim 4, further comprising a prefetch command changing unit that optimizes a prefetch command in the computer program using the prefetch miss count, in a format usable by the computer program, read to the profiler by the notification reading unit.

6. An information processing method of performing a prefetch for predicting data that is likely to be accessed by a central processing unit, for reading the predicted data from a main memory, and for storing the predicted data in a cache area in advance, the information processing method comprising:

storing, in a usage information storage unit, a command identifier uniquely identifying a command causing the prefetch and usage information of data prefetched by the command, the usage information being associated with the command identifier and indicating whether the prefetched data has been accessed;

writing the usage information of the prefetched data in the usage information storage unit;

reading, upon discarding data from the cache area, usage information of the data from the usage information storage unit;

performing a prefetch miss count indicating the number of times when the prefetched data has not been accessed, by using the usage information read at the reading;

converting the prefetch miss count, performed at the performing, to have a format usable by a computer program; and notifying that the prefetch miss count, performed at the performing, has exceeded a predetermined threshold to a computer program.

\* \* \* \* \*